United States Patent [19]

Spotnitz et al.

[11] Patent Number: 5,039,383
[45] Date of Patent: Aug. 13, 1991

[54] HALOGEN GENERATION

[75] Inventors: Robert M. Spotnitz, Baltimore; Douglas S. McFarland, Westminster, both of Md.

[73] Assignee: W.R. Grace & Co.-Conn., New York, N.Y.

[21] Appl. No.: 340,940

[22] Filed: Apr. 20, 1989

[51] Int. Cl.$^5$ .............................. C25B 1/02; C25B 1/24
[52] U.S. Cl. ...................................... 204/128; 204/129
[58] Field of Search .......................... 204/128, 129, 103

[56] References Cited

U.S. PATENT DOCUMENTS

| | | | |
|---|---|---|---|
| 3,305,472 | 2/1967 | Oldershaw et al. | 204/128 X |
| 4,110,180 | 8/1978 | Nidola et al. | 204/128 |
| 4,203,814 | 5/1980 | Grantham | 204/128 X |
| 4,263,111 | 4/1981 | Hooper et al. | 204/129 |

Primary Examiner—Donald R. Valentine
Attorney, Agent, or Firm—Howard J. Troffkin

[57] ABSTRACT

A process for forming halogen of chlorine and/or bromine by subjecting aqueous hydrohalic acid electrolyte solution to an electrical current while providing a continuous flow of inert gas through the solution and maintaining the solution at a substantially invariant level and composition.

6 Claims, 2 Drawing Sheets

HALOGEN GENERATION

BACKGROUND

The present invention is directed to an improved electrochemical method for continuously generating chlorine and/or bromine and to the apparatus required to perform the method. Specifically, the method is directed to the electrolysis of hydrohalic acid of an aqueous hydrohalic acid solution, continuously removing hydrogen and halogen gaseous products with simultaneous removal of portions of the electrolyte water from the electrochemical cell while maintaining a substantially invariant electrolyte solution.

The present process and device provides a simple, highly efficient means of producing halogen product in high yields without the need for an elaborate divided cell while preventing explosive concentrations of hydrogen to develop within the system and providing for substantially reduced corrosion problems.

The use of halogens, either individually or as mixtures, for water treatment is well known. Chlorine, bromine and their mixtures are known effective biocides for cooling water and swimming pool facilities, are useful for sterilization of drinking water and for the disinfection of waste materials. However, the use of halogens (The term "halogen" or halogens" shall refer herein and in the appended claims to chlorine and bromine unless otherwise specifically designated.) has been curtailed, especially at small to moderate size facilities, because of the difficulty and hazards involved in their transportation, storage and handling. For example, it is well known that storage and handling of halogen gases requires extreme care and precautionary measures. In the event of an accidental leakage of a large quantity of the halogen gas, considerable harm could come to the surrounding environment and to individuals in the vicinity. Because of the problems associated with handling and storage of pure halogen gases, there has been a great effort to develop either alternate means of providing halogen based biocides, as well as on-site generation of halogen gas as it is needed.

Concentrated solutions of sodium hypochlorite has been used in place of chlorine gas. Precautions must be maintained in handling hypochlorite solutions as exposure to them is known to cause severe damage to humans. In addition, such solutions have only limited shelf life and, therefore, must be used within a short period of a few weeks. Finally, there is a significant increase in cost and, thus, an economic barrier to use the hypochlorite solution in place of pure chlorine gas, especially in larger scale applications. Similar hypobromite solutions are not commercially available as these solutions are extremely unstable having the ability to remain active for only several hours to a few days.

Another alternative is the utilization of "halogen carriers." These carriers are usually solid organic compounds capable of releasing halogen when dissolved in water. For example, bromochlorodimethyl hydantoin (BCDMH) is a compound known to dissociate in water to form hypobromous and hypochlorous acids. Thus, compounds, such as BCDMH, provide a safe, convenient and easy to use form of providing halogen. The major drawback is the high cost of these materials which limits their practical use to only very small applications.

Recently, electrochemical halogen generators have received a great deal of attention as a means of generating halogen at the site of use and, thus avoid the transportation, handling and storage problems. The raw materials, alkali metal salts and electricity are safe and easily handled and the cost of halogen generation by this method is typically much lower then that of halogen carriers. Because this means is normally conducted in aqueous systems, hydrolysis occurs causing the ultimate product to be hypobromous or hypochlorous acid and, therefore, these generators are sometimes referred to as hypobromite or hypochlorite generators. Typical generators are disclosed in U.S. Pat. Nos. 3,305,472 and 4,208,123. In addition, J. P. Willington et al. in "Modern Chlor-Alkali Technology," Vol. 3, Pg. 400-404 (1986) Ed. by K. Wall, describes several electrochemical devices for generating hypochlorite in a continuous manner. Each of the devices require the use of precious metal anodes to inhibit corrosion and produce a dilute hypochlorite stream (0.5 to 2 g/l) from a 3 weight percent sodium chloride feed stream. These systems are, therefore, only applicable when appreciable amounts of salt can accompany the hypochlorite product.

In general, electrochemical halogen generators use dilute brine as the feed and, therefore, are susceptible to electrode fouling and corrosion due to precipitation of calcium and magnesium compounds at the cathode. The generators have design features which limit them to production of bromine or chlorine but are not interchangeably or capable of providing mixtures of halogens. The generators are normally required to be used in a batch mode either because of depletion of feed material and/or because of maintenance and antifouling work must be conducted on the system. Such requirements cause the known generators to be inefficient and cumbersome to handle. A further defect of presently known generators is the requirement that a diaphragm be used to separate the cathodic and anodic portions of the cell and the product streams generated by each portion. These diaphragms reduce the effectiveness and efficiency of the cell and are another element which undergoes corrosion from the generated elements. Overall, the known electrochemical generators provide low conversion, are of low efficiency, require periodic supervision to cleanse the system of spent material and replenish feed stock and require elaborate and expensive parts (i.e. electrodes) and equipment to overcome the corrosive nature normally encountered.

It is highly desired to provide a means for generating halogens by an electrochemical process which permits continuous operation of the system, permits the use of conventional low cost equipment and electrodes, provides for high efficiency and yield of halogen, does not need an elaborate divided cell configuration and permits the production of either chlorine or bromine or mixtures thereof utilizing the same equipment and method.

SUMMARY OF THE INVENTION

The present method and device, as hereinbelow described in detail, provides a means for forming either chlorine or bromine or mixtures thereof in a continuous manner. The method provides a means of inhibiting the corrosion of the cell electrodes and does not require the use of a divided cell configuration with its necessary diaphragm.

The present method provides for the generation of halogen in an electrolytic cell by the electrolysis of a hydrohalic acid contained in an aqueous hydrohalic acid solution as the cell electrolyte while maintaining the solution at an elevated temperature. The cell is provided with a means to continuously remove molecular hydrogen and halogen and electrolyte water from the cell while maintaining a predetermined level of the cell's electrolyte solution as a substantially invariant composition.

Specifically, the method is conducted using an electrolytic cell provided with a positive and negative electrode and an electrolyte solution in the form of an aqueous hydrohalic solution. While maintaining a current across the cell, an inert gas is sparged through the electrolyte to strip the hydrogen and halogen formed as well as to cause simultaneous removal of electrolyte water. A sensing means is provided to sense the reduction in electrolyte volume and to cause introduction of fresh aqueous hydrohalic acid solution to the cell. The inert gas carrier stream containing the cell products and water can be safely used for direct treatment of water systems and the like by bubbling the product ladened gas stream through the system to be treated.

FIGURES

DETAILED DESCRIPTION OF THE INVENTION

Figure 1:
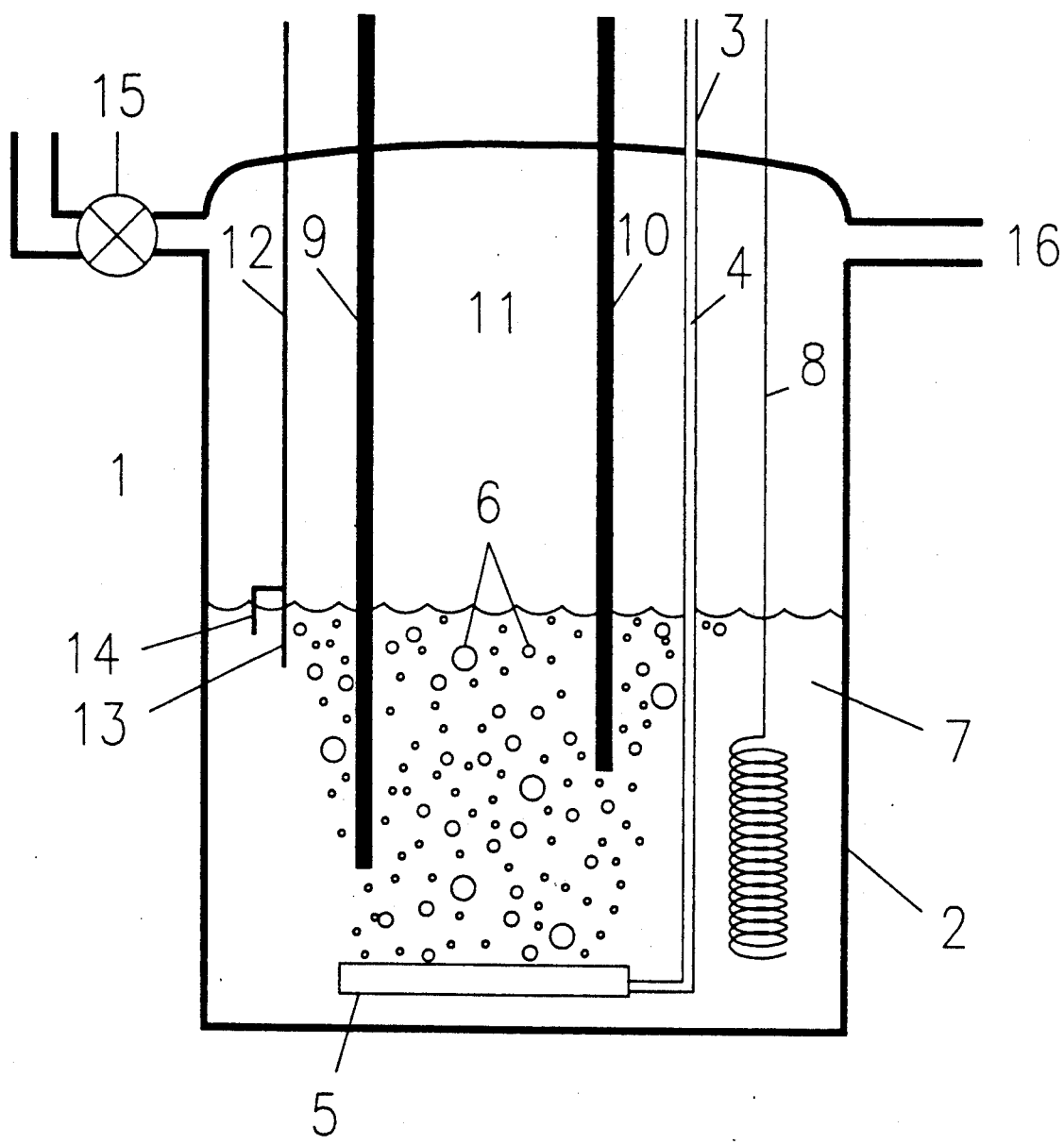
FIG. 1 is a schematic of an electrochemical cell capable of continuously generating halogen according to the present invention.

The present invention provides a method and device to continuously produce halogen product without having to be concerned with scale formation, corrosion problems or interruption of cell operation to clean and replenish cell as is customary with conventional modes presently used. The present method provides a means of generating halogen using a simple apparatus which can be situated at the site of use and, thereby, eliminates handling, storage and transportation problems commonly associated with halogen usage. The present process uses inexpensive material and achieves high yields and efficiency to provide a commercially desirable halogen production technology.

The present process is an electrochemical means of producing chlorine or bromine or mixtures of these halogens using a hydrohalic acid solution of the desired halogen as the feed material and the electrolyte of the cell in which the process is conducted. The hydrohalic acid solution (hydrogen chloride when chlorine is the desired halogen; hydrogen bromide when bromine is desired halogen; and mixtures of these acids when a mixed halogen product is desired.) can be a commercially obtained aqueous hydrochloric or hydrobromic acid solution. These solutions are relatively inexpensive and readily available to obtain. The solutions can be in the form of concentrated acid solutions or a diluted acid solution. When the acid solution is hydrochloric, the concentration can range from about 0.1 to 20 weight percent, preferably from about 10 to 20 weight percent and most preferably from about 10 to 18 weight percent. The 20 weight percent concentration is normally the upper limit for hydrochloric acid so that the acids vapor pressure is less than that of water under operating conditions, as fully described below. Similarly, when an aqueous hydrobromic acid solution is utilized as the electrolyte, the concentration can range from about 0.1 to 49 weight percent and most preferably from about 30 to 40 weight percent. Again, as with the hydrochloric acid solution, these concentration ranges are below the boiling point of the acid under the operation conditions. It is preferable to use high concentration of the acid as this aids in increasing the overall efficiency of the cell. When a mixture of acid is used as the electrolyte, the ratio of hydrochloric to hydrobromine acid can be from about 0.01 to 100 although greater or lesser ratios can be used.

The water used in forming the electrolyte solution can be obtained from any source. However, it is preferred that the water be deionized to reduce the potential for contamination of the cell. This is readily done as commercially obtained hydrohalic acid solutions are formed with such water. If dilution of the acid solution is desired, one can treat commercial tap water by passing it through a purification column to remove minerals therein. Hard water, such as well water should be avoided, if possible.

The hydrohalic acid electrolyte solution is introduced into an electrochemical cell having at least one positive and at least one negative electrode. The cell is preferably of an undivided configuration (i.e., a cell without separate anolyte and catholyte chambers separated by a diaphragm).

The electrodes of the cell can be formed from conventional electrical conductive materials. For example, conventional carbon (graphite) electrodes can be used for either the positive or negative electrode or as the electrode pair. The negative electrode may also be formed from titanium, lead, copper and the like. The positive electrode may also be formed from platinum, iridium and the like although carbon is the preferred material because it is inexpensive and readily available. When the electrolysis is conducted under the conditions of the present method, it has been unexpectedly found that the readily attainable electrodes of carbon do not decompose or degrade, as is commonly observed in presently known systems.

The electrolysis must be conducted under conditions which provide a means for the continuous and simultaneous removal of formed hydrogen, chlorine and of a portion of the water of the electrolyte solution during the cell's operation. The means for removing these materials can be accomplished by sparging the cell with an inert gas, such as air, nitrogen, carbon dioxide, argon and the like. The preferred gas is air. The air can be introduced into the cell via a fritted disc or through packing (o-rings, etc.) located in the electrolyte solution. The fritted disc can be formed from any material which is inert to the system, such as glass, carbon, Teflon and the like. Similar material can be used to form the packing material, when it is used as the means of dispersing the gas through the electrolyte. Whatever form is used to disperse the gas entering the system, it is preferable to have the dispersing means located below the electrodes of the cell and the gas dispersing means and the electrodes should be positioned so that the gas can pass substantially parallel to the electrodes without being impeded in its flow from the dispersing means to the cell's exit port. The rate of flow of the inert gas should be adjusted and maintained at a rate sufficient to remove the hydrogen and halogen as they are formed and to simultaneously remove a portion of electrolyte water to cause the remaining electrolyte to have a substantially invariant composition. The rate will be dependent upon the particular halogen(s) being produced, the temperature at which the electrolyte is being maintained, the configuration of the cell and the components therein. The desired rate to run a particular halogen generator of the present invention can be readily determined by conducting some trial runs as would conventionally be done. In most cases the air flow rate may range from about 0.5 to 3 ft$^3$/ft$^2$ tank cross section/min.

An alternate means to conduct the continuous and simultaneous removal of formed hydrogen, halogen and water can be by having the cell's atmosphere be at a reduced pressure. This can be accomplished by a variety of ways known to the artisan, including having the cell's exit port connected to an aspirator. The aspirator may be incorporated as part of the circulating flow of the water to be treated (i.e., as part of the return piping circulating the water and, thus, the exit gases would be directly used to treat the water).

The electrolyte solution should be maintained at an elevated temperature sufficient to aid in the simultaneous removal of the electrolyte water from the cell. The upper limit of the temperature is the boiling point of the electrolyte solution and will, thus, depend on the particular composition of the electrolyte used. It is preferable to have the solution at a temperature of up to about 5° C. below the boiling point temperature of the electrolyte. Temperatures of from about 40° C. to about 75° C. and preferable from about 50° C. to about 75° C. The elevated temperature of the electrolyte aids in the concurrent removal of the electrolyte water along with the formed hydrogen and halogen gases. Thus, the use of elevated temperature aids the gas sparging of the electrolyte water along with the hydrogen and halogen gaseous products in a continuous manner. When the electrolyte is maintained at a low temperature, the velocity of the gas being sparged through the system must be proportionately increased. In instances where the cell is being conducted under a reduced atmosphere, lower electrolyte temperatures would be appropriate.

The electrochemical process of the present invention can be continuously run for extended periods of time by maintaining the electrolyte solution at a substantially constant level within the cell with the addition of fresh aqueous hydrohalic solution. The determined level can be readily maintained on an automated basis by the use of a conventional liquid level indicator such as a float, ultra sound, electrical resistance probe or the like. The indicator device can be connected to a solenoid valve or pump to cause the addition of fresh electrolyte to enter the cell from a reservoir. The particular level at which the electrolyte is to be maintained will be determined by the current density of the cell. When either hydrochloric or hydrobromic acid is used as the electrolyte solution, the electrolyte level in the cell is not sensitive. Thus the fresh aqueous acid electrolyte solution can be discontinuously added to the cell without effecting the cells efficiency or performance. When it is desired to concurrently produce chlorine and bromine product and, thus, use a mixture of hydrochloric and hydrobromic acids, it is most preferable to have the aqueous acid mixture added on a substantially continuous mode to closely maintain the determined electrolyte level. For example, as the cell's electrolyte solution is depleted (by formation of hydrogen, Br$_2$, and Cl$_2$ and the evaporation of electrolyte water) the mixed acid electrolyte should be simultaneously added.

The electrochemical cell used to perform the subject process can be conducted at a high current density. The positive electrode can have a current density of from about 10 to 200 mAmp/cm$^2$ (preferably from about 100 to 200 mAmps/cm$^2$) when chlorine is the halogen product and a current density of from about 10 to 400 mAmp/cm$^2$ (preferably from about 250–400 mAmp/cm$^2$) when bromine is the halogen product. When mixtures of halogens are produced the current density should be from about 10 to 200 mAmp/cm$^2$ (preferably from about 100 to 200). The negative electrode can be at any current density.

The electrodes can be in the electrochemical cell in any convenient position. Spacing of the electrodes is not critical. The further they are spaced, though, will require increased voltage to generate the desired amperage. It is preferred that the positive/negative electrode pair be spaced from 0.1 to 10 cm and preferably from 0.1 to 5 cm apart. The electrode pair should have a symmetrical (parallel to each other) configuration to attain a uniform current distribution. In addition it is preferred that the electrodes are positioned so as to be in line with the gas sparging direction so that they do not impede the gas flow. Finally, each negative electrode, of each electrode pair, is preferably in a configuration or position which makes it less accessible to the formed halogen gas product. This can be readily achieved by having each negative electrode immersed to a lesser degree in the electrolyte solution in comparison to the positive electrode or, alternately, masking part of the electrode surface to have it inert (such as by painting with an inert coating) or having the negative electrode formed from a grid or screen or other configuration which exposes less surface area than the positive electrode.

It has been found that the electrochemical cell used to perform the present process can use conventional electrodes without encountering the problems of corrosion, cracking and electrode failure as is commonly encountered in electrochemical production of halogens. The positive electrode can be formed from carbon, graphite, platinum, iridium and the like with carbon and graphite being preferred for economic reasons. The negative electrode can be formed from carbon, lead, copper, titanium and the like (the metal electrode can be in the form of a supported metal) with carbon, lead and copper being preferred.

Referring to FIG. 1 which shows one embodiment of the electrochemical cell (1) used to accomplish the continuous process of the present invention. The cell comprises a container (2) equipped with a gas sparger (3) made up of a gas inlet tube (4) and a fritted disc (5) to emit and disperse an inert gas as a stream of bubbles (6) through the electrolyte solution (7). The electrolyte solution contains an immersion heater and sensor (8) to maintain the electrolyte solution at a desired elevated temperature.

The cell also contains an anodic electrode (9) and a cathodic electrode (10). These electrodes are positioned parallel to each other and symmetrical to the flow of gas (6) from the sparger (5) to the air chamber (11) located above the electrolyte solution. A constant current or constant voltage can be applied across the electrodes (9) and (10) to drive the electrochemical reaction. At the anode, the following electrochemical reactions can take place:

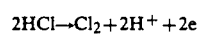

$$2HCl \rightarrow Cl_2 + 2H^+ + 2e \qquad\qquad I$$

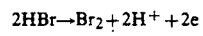

$$2HBr \rightarrow Br_2 + 2H^+ + 2e \qquad\qquad II$$

At the cathode, the following reactions can take place:

$$Cl_2 + 2e \rightarrow 2Cl^-$$  III $$Br_2 + 2e \rightarrow 2Br$$  IV $$2H^+ + 2e \rightarrow H_2$$  V The current density at the cathode is preferably higher than the current density at the anode to minimize the halogen loss reactions III and IV. This is accomplished in the illustrated cell by having less cathodic electrode surface area in contact with the electrolyte by having the cathode less submerged into the electrolyte in comparison to the anodic electrode.

The inert gas (6) which passes through the electrolyte solution (7) strips the halogen product of reaction I and/or II from the solution and thereby also minimizes reactions III and IV. In addition, the inert gas strips the hydrogen formed by reaction V and dilutes it well below the explosive limit of hydrogen in air. Further, the gas sparging agitates the solution and, thereby, provides continuous fresh hydrohalic acid to the anode to more effectively and efficiently cause the reduction to halogen product. Finally, the gas sparging, as discussed above, provides a means to cause the continuous removal of water from the electrolyte solution in conjunction with the removal of hydrogen and halogen products. These products are removed via the cell's exit port (16).

As the components of the electrolyte are removed, the volume of the solution is diminished. A level sensor (11) suitable for accurately sensing the electrolyte solution level is positioned to aid in maintaining a constant level. For example, an electronic sensor (12) having a positive (13) and negative (14) probes disposed at different levels and thereby forms a completed circuit when both are immersed and an open circuit when the level is reduced. The sensor provides a signal (via electronics not shown) to a solenoid valve (15) which allows introduction of fresh make-up aqueous hydrohalic solution.

Figure 2:
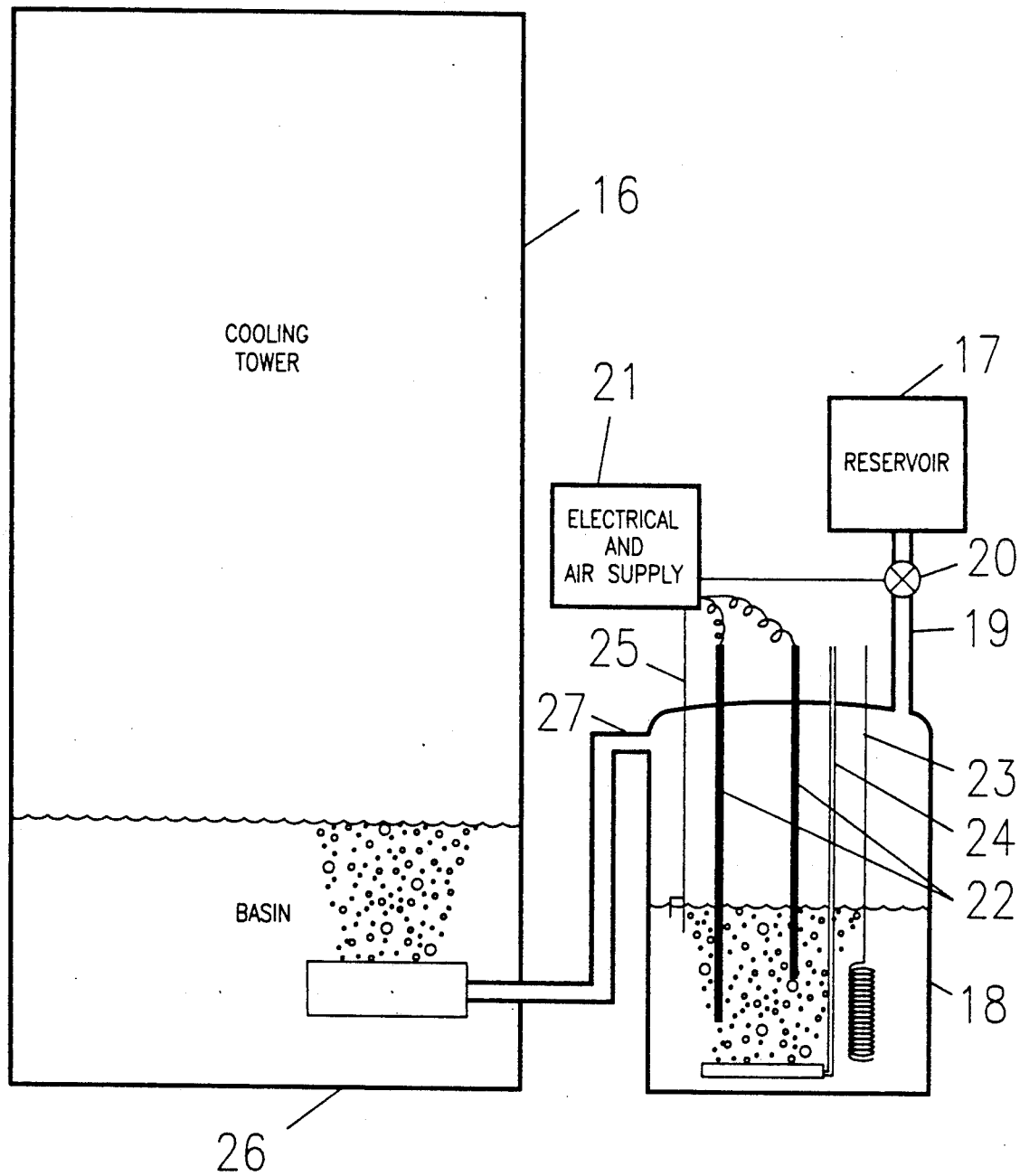
FIG. 2 is a schematic illustration of a typical cooling tower system provided with the halogen generating/water treatment apparatus of the present invention.

FIG. 2 shows the use of the present electrochemical halogen generator as part of a treated facility in the form of a cooling tower (16). The hydrohalic acid aqueous solution flows from reservoir (17) into the electrochemical cell (18) via a feed tube (19) which has a valve (20) capable of shutting off flow. Air and electric power supply and control (21) are transmitted to the cell to carry out the electrolysis of the hydrohalic acid by electrodes (22), to heat the solution via heater (23), to supply sparging air (24) and to monitor electrolyte liquid level via sensor (25). When the level is low the sensor sends a signal via the control (21) to valve (20) causing it to open and provide additional electrolyte to the cell. The air sparger (24) within the cell (18) carries the products and electrolyte water out of the cell to the basin (26) of the cooling tower (16) via conduit (27). The wet gas stream is absorbed into the cooling tower liquid and thus provides the desired biocide treatment to the system.

The following examples are given for illustrative purposes only and are not meant to be a limitation on the subject invention. All parts and percentages are by weight except where indicated otherwise.

EXAMPLE 1

An electrochemical cell was formed from a closed one liter glass lined container equipped with a pair of carbon rod electrodes, a quartz immersion heater with temperature controller, a carbon frit sparger located at the bottom of the container and a commercially obtained (Cole Palmer) electronic liquid level controller. The container had a liquid inlet port and a gas exit port. 400 ml of an aqueous 20% HCl solution was introduced into the cell and heated and maintained at 70° C. The carbon electrodes (anode: ⅜" diameter, 2" submersed in electrolyte; cathode: ¼" diameter, 1.5" submersed in electrolyte) were positioned parallel to each other and spaced approx. 3 cm apart. The electrodes were connected to a constant current power supply and run at a current of 2 Amperes. Compressed air was sparged through the carbon frit into the cell at a flow rate of 2.1 liters per minute maintained with an inline pressure regulator. The inlet port of the cell was connected via a feed line with selenoid valve to a reservoir tank containing 20% HCl aqueous solution. The cell was electrolyzed and generated hydrogen and chlorine gas which were continuously flushed out of the cell along with a portion of the electrolyte water. Each time the level of electrolyte decreased, the liquid level indicator activated the solenoid valve of the feed stream to provide a small portion of electrolyte make-up solution to enter the cell and thereby maintain a substantially constant level and composition of electrolyte in the cell.

The cell was run continuously for 300 hours without any signs of fouling or electrode deterioration. The measured current efficiency for chlorine generation was 77% and the chlorine yield was 58% based on HCl consumed.

EXAMPLE II

The cell described in Example I above was used to produce bromine. The cell was initially filled with 400 ml of a 30% HBr aqueous solution (commercially obtained). The cell was run at 3 Amperes current with a compressed air sparge run at 1 liter per minute. The electrolyte level was maintained by feeding 30% HBr aqueous solution as make-up. The electrolyte solution was maintained at 65° C.

Bromine was generated continuously over 1000 hours without any sign of fouling or electrode deterioration. The measured current efficiency was 46% and the bromine yield was 85% based on HBr consumption.

EXAMPLE III

The generation of bromine from HBr electrolysis was performed as described in Example II above except that the initial electrolyte solution and the make-up solution were 49% HBr aqueous solutions.

The cell was run for 1000 hours without signs of deterioration of the cell's elements. The cell's current efficiency was measured to be 42% and the bromine yield was 87% based on HBr consumption.

EXAMPLE IV

The generation of a mixture of bromine and chlorine was accomplished using a cell formed from a 1 liter polytetrafluoroethylene lined vessel equipped with inlet and outlet ports, as well as liquid level controller, electrodes, heater and sparger. The electrodes were a carbon plate anode (ALLOR-10 from Carbone, 2.125"×0.625"×1.5" completely immersed) and a carbon rod cathode (0.25" dia., 1.5" immersed). The heater was a quartz heater. The sparger was a glass frit. The electrolysis was conducted at a current of 5.75 Amperes (controlled by a constant voltage power supply). The initial and make-up electrolyte was a mixture of two parts by volume of a 20% HCl aqueous solution and one part by volume of a 49% HBr aqueous solution and was maintained at 70° C. When the electrochemical generation of bromine and chlorine was conducted, the cell was sparged using compressed air at a flow rate of about 4 liters per minute which was controlled by an in-line pressure regulator. The electronic level controller was capable of sensing small changes in electrolyte level and provided for on demand fresh acid electrolyte to be introduced into the cell. The volumetric introduction was set at a low rate so that the acids were substantially continuously fed into the cell.

The cell was run continuously for over 1000 hours without fouling or corrosion problems. The measured current efficiency for halogen generation was 86% with an overall halogen yield of 80% based on acid consumption.

What is claimed is:

1. A process for the continuous production of chlorine and/or bromine comprising introducing an aqueous acidic solution of a hydrohalic acid of the formula HX wherein X represents a halogen selected from Cl and/or Br to a set level into an electrochemical cell as the cell's electrolyte, said cell having at least one positive and at least one negative electrode in contact with said solution and said set level being a level at which the solution covers at least a portion of each electrode, providing an electrical current across the cell to cause formation of hydrogen and halogen, maintaining the solution at a temperature of at least about 40° C., continuously removing molecular hydrogen, halogen and water from the cell while sparging the electrolyte solution with an inert gas and maintaining the cell's acidic electrolyte solution at substantially said set level by introducing additional solution of HX into said cell.

2. The process of claim 1 wherein the hydrohalic acid is hydrochloric acid, the acid is in the electrolyte at a concentration of from 0.1 to 20 weight percent and the electrical current is maintained at an anodic current density of from about 10 to 200 mA/cm$^2$.

3. The process of claim 2 wherein the hydrochloric acid is present in the electrolyte in a concentration of from about 10 to 20 weight percent.

4. The process of claim 1 wherein the hydrohalic acid is hydrobromic acid, the acid is in the electrolyte at a concentration of from 0.1 to 49 weight percent and the electrical current is maintained at an anodic current density of from about 10 to 400 mA/cm$^2$.

5. The process of claim 4 wherein the hydrobromic acid is present in the electrolyte in a concentration of from about 30 to 49 weight percent.

6. The process of claim 1 wherein the hydrohalic acid is a mixture of aqueous solutions of 0.1 to 20 weight percent of HCl and of 0.1 to 49 weight percent of HBr such that the concentration of each acid is below the vapor pressure of water at the solution temperature within the cell and performing the electrolysis at a current density of from about 10 to 200 mA/cm$^2$.

* * * * *